US009950669B2

(12) United States Patent
Sypitkowski et al.

(10) Patent No.: US 9,950,669 B2
(45) Date of Patent: Apr. 24, 2018

(54) VEHICLE CAMERA SYSTEM WITH MULTIPLE-CAMERA ALIGNMENT

(71) Applicant: Robert Bosch GmbH, Stuttgart (DE)

(72) Inventors: Greg Sypitkowski, Farmington Hills, MI (US); Michael Huebner, Hemmingen (DE); Mark Gehrke, Ypsilanti, MI (US)

(73) Assignee: Robert Bosch GmbH, Stuttgart (DE)

(*) Notice: Subject to any disclaimer, the term of this patent is extended or adjusted under 35 U.S.C. 154(b) by 197 days.

(21) Appl. No.: 14/939,149

(22) Filed: Nov. 12, 2015

(65) Prior Publication Data

US 2017/0136948 A1 May 18, 2017

(51) Int. Cl.
*G06T 3/00* (2006.01)
*B60R 1/00* (2006.01)
*G06K 9/00* (2006.01)
*G06K 9/46* (2006.01)
*H04N 5/232* (2006.01)
*H04N 5/247* (2006.01)
*H04N 5/265* (2006.01)
*G06T 7/80* (2017.01)

(52) U.S. Cl.
CPC ............ *B60R 1/00* (2013.01); *G06K 9/00791* (2013.01); *G06K 9/4671* (2013.01); *G06T 7/80* (2017.01); *H04N 5/23238* (2013.01); *H04N 5/247* (2013.01); *H04N 5/265* (2013.01); *B60R 2300/105* (2013.01); *B60R 2300/303* (2013.01); *B60R 2300/607* (2013.01); *G06T 2207/30208* (2013.01); *G06T 2207/30252* (2013.01)

(58) Field of Classification Search
CPC ........ B60R 1/00; G06T 7/80; G06K 9/00791; G06K 9/4671; H04N 5/23238; H04N 5/247; H04N 5/265
See application file for complete search history.

(56) References Cited

U.S. PATENT DOCUMENTS

| 8,130,270 B2 | 3/2012 | Ito et al. |
| 8,576,285 B2 | 11/2013 | Gomi et al. |
| 2007/0008312 A1* | 1/2007 | Zhou ................. G06T 7/80 345/419 |
| 2008/0181488 A1 | 7/2008 | Ishii et al. |
| 2013/0250046 A1 | 9/2013 | Schofield et al. |

(Continued)

FOREIGN PATENT DOCUMENTS

| WO | 2013/019707 | 2/2013 |
| WO | 2015/029934 | 3/2015 |

OTHER PUBLICATIONS

Huang et al. "Fish-eye Cameras Calibration for Vehicle Around View Monitoring System," 2014 IEEE International Conference on Consumer Electronics—Taiwan, May 26, 2014, pp. 225-226.

(Continued)

*Primary Examiner* — Christopher Findley
(74) *Attorney, Agent, or Firm* — Michael Best & Friedrich LLP

(57) ABSTRACT

Systems and methods are described for creating a unified output image based on image data from multiple cameras with overlapping fields of view by converting a raw image from each camera into a rectified output image using a look-up table. Camera misalignments are mitigated by generating an updated look-up table based on feature point detection and matching in the overlapping fields of view.

14 Claims, 8 Drawing Sheets

(56) References Cited

U.S. PATENT DOCUMENTS

| | | | |
|---|---|---|---|
| 2013/0293717 A1 | 11/2013 | Zhang et al. | |
| 2014/0085469 A1* | 3/2014 | Sakano | H04N 17/002 348/148 |
| 2014/0184799 A1 | 7/2014 | Kussel | |
| 2014/0247352 A1 | 9/2014 | Rathi et al. | |
| 2014/0300704 A1* | 10/2014 | Ramaswamy | G06T 7/002 348/48 |
| 2015/0302561 A1* | 10/2015 | Pekkucuksen | G06T 5/006 382/275 |
| 2017/0094158 A1* | 3/2017 | Van Olst | H04N 5/23219 |

OTHER PUBLICATIONS

International Search Report and Written Opinion for Application No. PCT/EP2016/074688 dated Dec. 15, 2016 (12 pages).

* cited by examiner

VEHICLE CAMERA SYSTEM WITH MULTIPLE-CAMERA ALIGNMENT

BACKGROUND

The present invention relates to vehicle camera systems that capture images of the area around a vehicle and either display image data to a driver of the vehicle or use the image data to operate another vehicle system.

SUMMARY

When displaying video or still image data from cameras with overlapping fields of view, it is desirable that the cameras be aligned to eliminate distracting discontinuities and to provide a unified image. Some of the systems and methods described herein provide a multiple camera system for a vehicle including at least two cameras on a vehicle with overlapping fields of view and a central processor. The processor receives image data from the cameras, interprets the image data, and determines the camera orientation misalignment between adjacent cameras from an initial camera placement. Once the misalignment has been determined, the processor can transform the incoming images to present a unified image including image data from both cameras.

In some implementations, the system is configured to generate "top-view" image and/or video data to simulate an image captured by a camera positioned to look down on the vehicle from above. The top-view image can then be displayed to the driver of the vehicle on a display screen situated in the interior of the vehicle. The top-view image can also be used by other automated or semi-automated vehicle systems include lane departure warning systems, back-up assist systems, and adaptive cruise control systems.

In one embodiment, the invention provides a method of generating an aligned unified image using image data from at least two cameras positioned on a vehicle. Raw image data is received from a first camera positioned on the vehicle and is converted into a first rectified output image using a first look-up table. The first look-up table defines at least one pixel location from the raw image data that corresponds to each pixel of the first rectified output image. The first rectified output image has a perspective that is different from that of the raw image data from the first camera. Raw image data is also received from a second camera positioned on the vehicle and converted into a second rectified output image using a second look-up table. The field of view of the second camera partially overlaps with the field of view of the first camera. A first unified output image is generated by combining the first rectified output image and the second rectified output image. However, the image data from the first rectified output image is misaligned relative to the image data from the second rectified output image in the first unified output image. A plurality of feature points are detected in each of the first rectified output image and the second rectified output image. Feature points from the first rectified output image are matched to feature points from the second rectified output image and a yaw, pitch, and roll of the first camera is determined based on misalignments of the matched feature points. The first look-up table is updated based on the determined yaw, pitch, and roll of the first camera.

In another embodiment, the invention provides a multiple-camera vehicle imaging system including a first camera, a second camera, a processor, and a memory. The memory stores a first look-up table, a second look-up table, and computer-executable instructions that, when executed by the processor, process image data from the first and second cameras to produce an aligned rectified image.

Raw image data is received from the first camera, which is positioned on the vehicle, and is converted into a first rectified output image using a first look-up table. The first look-up table defines at least one pixel location from the raw image data that corresponds to each pixel of the first rectified output image. The first rectified output image has a perspective that is different from that of the raw image data from the first camera. Raw image data is also received from the second camera and converted into a second rectified output image using a second look-up table. The second camera is also positioned on the vehicle and has a field of view that partially overlaps with the field of view of the first camera.

The multiple-camera imaging system generates a first unified output image by combining the first rectified output image and the second rectified output image. However, the image data from the first rectified output image is misaligned relative to the image data from the second rectified output image in the first unified output image. A plurality of feature points are detected in each of the first rectified output image and the second rectified output image. Feature points from the first rectified output image are matched to feature points from the second rectified output image and a yaw, pitch, and roll of the first camera is determined based on misalignments of the matched feature points. The first look-up table is updated based on the determined yaw, pitch, and roll of the first camera and stored to the memory for use when subsequently processing image data.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory, computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

Figure 1A:
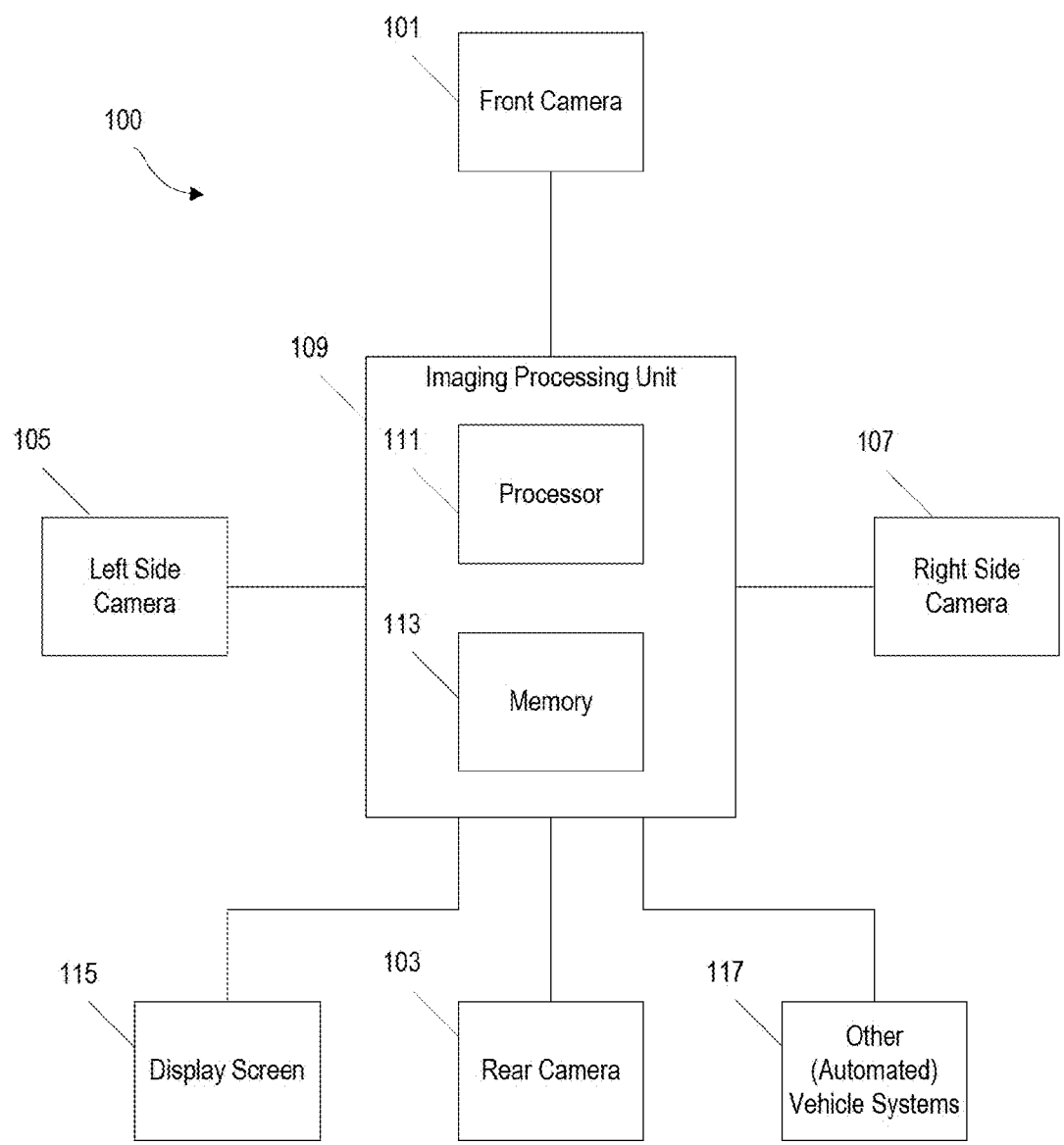
FIG. 1A is a block diagram of a multiple-camera imaging system for a vehicle according to one embodiment.
Figure 1B:
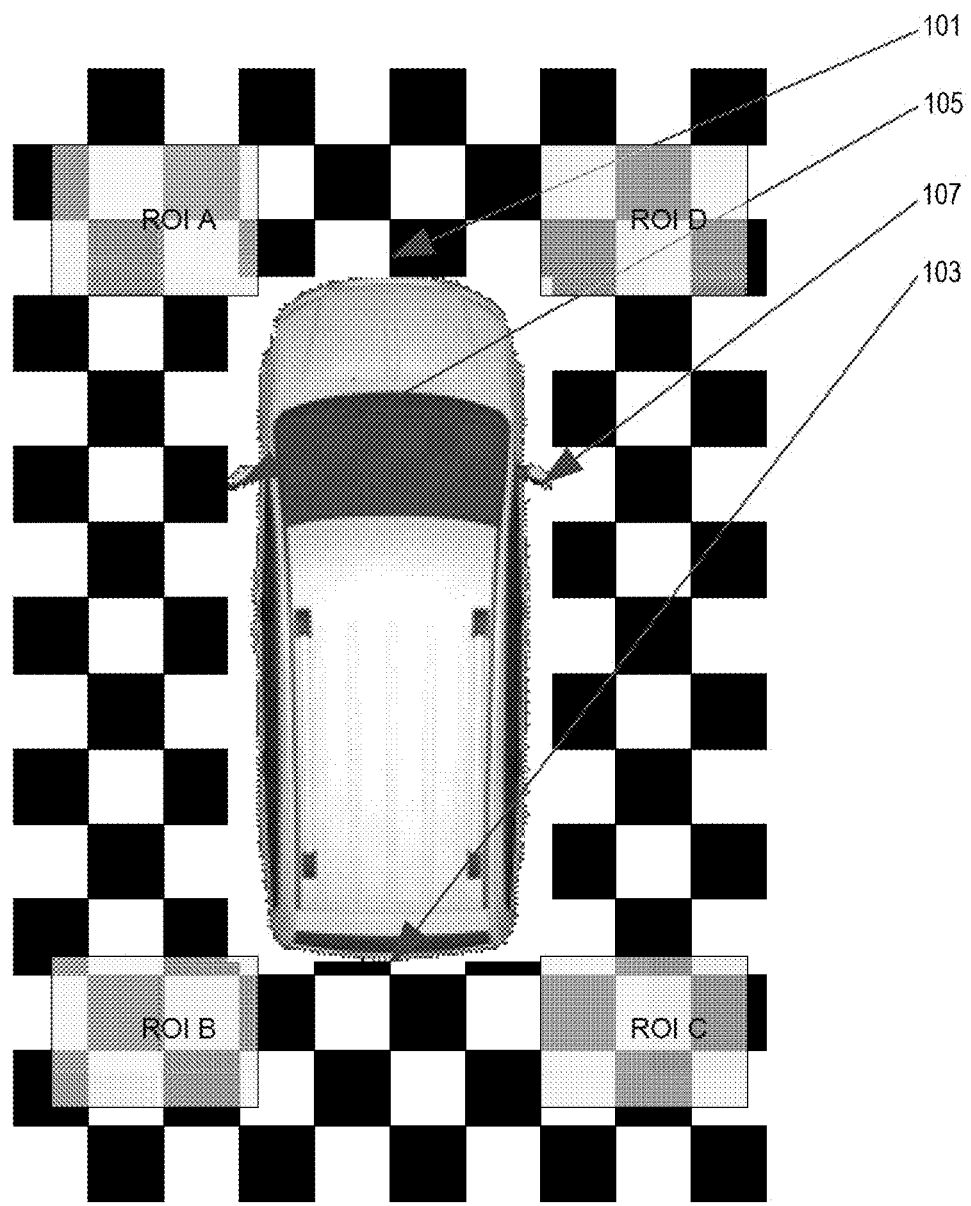
FIG. 1B is an overhead view of a vehicle equipped with the multiple-camera imaging system of FIG. 1A.

FIG. 1A illustrates an example of a multiple-camera imaging system 100 for a vehicle. The system includes four cameras mountable on the vehicle. The four cameras include a front camera 101, a rear camera 103, a left side camera 105, and a right side camera 107. As shown in FIG. 1B, the front camera 101 is to be mounted on the front of the vehicle (e.g., near the front bumper of the vehicle) with a field of view including the area in front of the vehicle. Similarly, the rear camera 103 is to be mounted on the rear of the vehicle (e.g., near the rear license plate mount) with a field of view that includes the area behind the vehicle. The left side camera 105 is to be mounted on the left side of the vehicle (e.g., in the left-exterior rear view mirror housing) with a field of view that includes the area to the left of the vehicle. The right side camera 107 is to be mounted on the right side of the vehicle (e.g., in the right exterior rear view mirror housing) with a field of view that includes the area to the right of the vehicle.

In some implementations, the cameras 101, 103, 105, 107 are equipped with a "fish eye"/omni-directional lens to increase the viewing angle of each camera. In other implementations, a wide-angle lens system that captures more traditional "rectilinear" image data may be used. However, in either case, the cameras 101, 103, 105, 107 in this example are configured and positioned such that the field of view of each camera partially overlaps with the field of view of two adjacent cameras. For example, as illustrated in FIG. 1B, the fields of view of the front camera 101 and the left side camera 105 overlap at the area labeled as region of interest (ROI) A. The fields of view of the left side camera 105 and the rear camera 103 overlap at the area labeled as ROI B, the fields of view of the rear camera 103 and the right side camera 107 overlap at the area labeled as ROI C, and the fields of view of the right side camera 107 and the front camera 101 overlap at the area labeled as ROI D.

Returning now to FIG. 1A, the imaging system 100 also includes an imaging processing unit 109 that receives image data from each of the four cameras 101, 103, 105, 107. The image processing unit 109 includes a processor 111 and a memory 113. The memory 113 can include one or more non-transitory computer-readable memory devices of various modalities including, for example, RAM, ROM, hard-disc, Flash, etc. The memory 113 stores instructions that, when executed by the processor, enable the image processing unit to provide the functionality described below. The memory 113 also stores information that is used by the image processing system to convert raw camera data from multiple cameras into a unified output image including the look-up tables as described in further detail below.

The image processing unit 109 is configured to process the image data from one or more of the connected cameras 101, 103, 105, 107 and to generate an output image that is displayed to the driver of the vehicle on a display screen 115 positioned inside the vehicle. Alternatively or additionally, the image processing unit 109 can transmit image data (through a wired or wireless interface) to another display screen located locally or remotely and to other automated or semi-automated vehicle control systems 117 that are configured to operate based on image data. Such vehicle control systems may include, for example, a lane departure warning system, a back-up assist system, a parking assist system, and various other automated cruise control systems.

Figure 2:
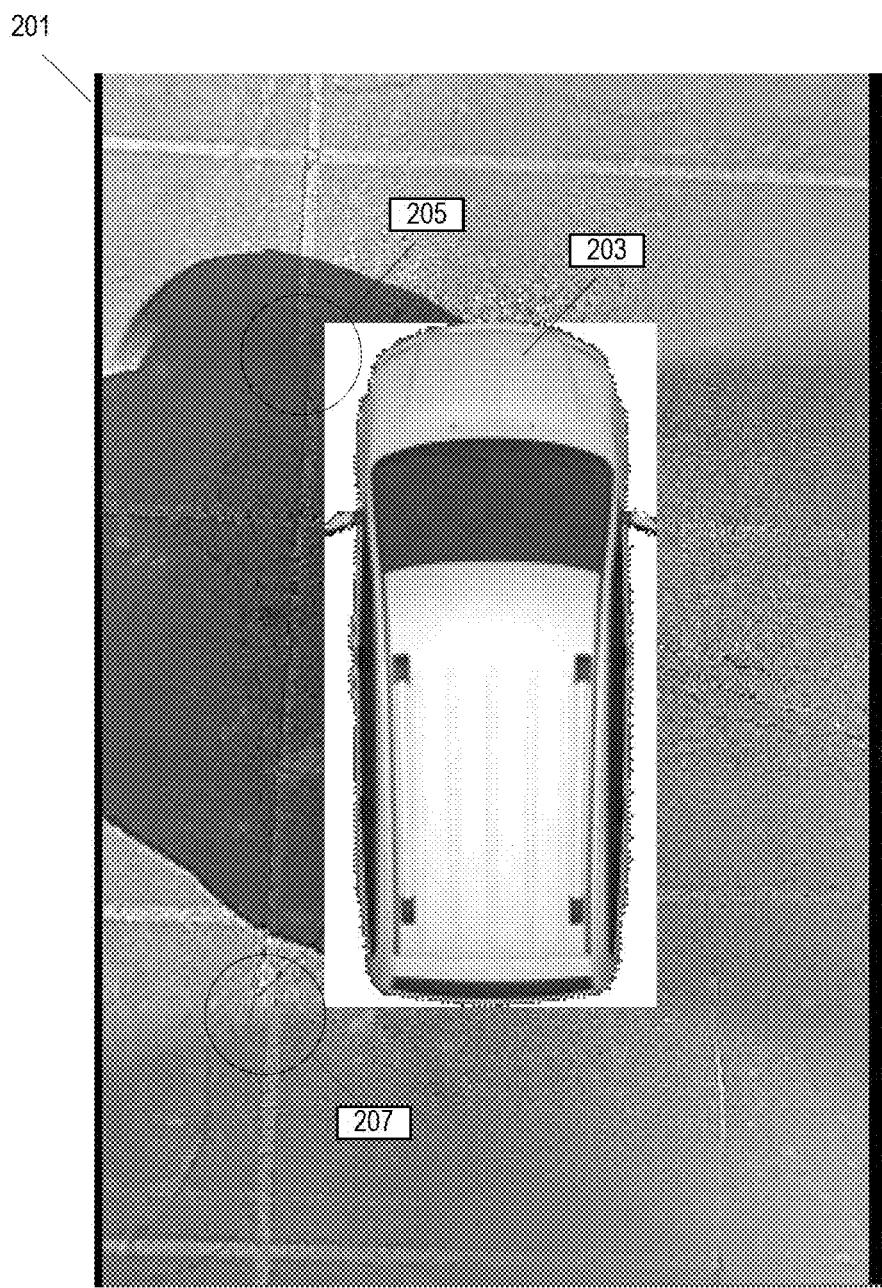
FIG. 2 is an example of a top-view image generated by the multiple-camera imaging system of FIG. 1A with a camera misalignment.

In some implementations, the imaging system 100 of FIG. 1A is configured to process the raw image data from each camera 101, 103, 105, 107 and to convert the image data from each camera to a "top-view" perspective. The top-view rectified images are then assembled into a single image output to simulate an image that would be captured by a camera positioned to look down on the vehicle from above. FIG. 2 illustrates an example of one such "top-view" image 201 that is generated by the image processing unit 109 and shown in the display screen 115. Because the four cameras 101, 103, 105, 107 are positioned around the vehicle with partially overlapping fields of view, the captured image data includes image data of the ground around the vehicle. This image data is combined with a stored "top-view" image of the vehicle itself 203, which is inserted in the middle of the assembled image data captured by the four cameras 101, 103, 105, 107 as shown in FIG. 2.

In this example, the image data provided by each of the four cameras in the imaging system 100 depends on a number of calibration parameters in order for each video image to be properly rectified into a homogeneous top-view (or other combined view). These parameters can be divided into two categories: intrinsic parameters and extrinsic parameters.

The intrinsic parameters are the fundamental characteristics associated with each individual camera and can include a camera lens/image center point (defined by 2D coordinates m0, n0), a camera aspect ratio (ar), the camera focal length (a0), and, for fisheye/omnidirectional lenses, a camera polynomial for fitting an image to a fisheye lens (a). Extrinsic parameters define the physical positions and mounting of the cameras on a vehicle and include the physical mounting position of the camera ($X_c$, $Y_c$, $Z_c$) and the three camera mounting angles—yaw, pitch, and roll.

Initial values for the intrinsic and extrinsic parameters for the camera system can be determined by a calibration process. For example, the vehicle equipped with the imaging system 100 can be positioned on a tiled grid on flat ground as shown in FIG. 1A. The tile grid can include defined reference points and the intrinsic & extrinsic parameters for each camera can be calibrated individually based on each cameras subjective view of one or more of the defined reference points on the tile grid.

The extrinsic parameters (i.e., the camera mounting positions and angles) are identified relative to the reference points on the tile grid during the calibration process. Because the distances between these reference points are known, the absolute camera positions and angles can be resolved when generating a look-up table that will be used to convert raw image data from each camera to "top-view" image data. Generation of the look-up table requires each of the camera's parameters and the x & y world coordinate reference points as inputs. These references points are defined in relation to the center of the vehicle and along the ground plane. The LUT generation algorithm uses a set of "Virtual Camera" parameters—including position, direction, field-of-view, and scale—and the screen output characteristics to define what the output image will look like. The generated, unsorted LUT is then sorted and compressed to be used by the image processing unit 109 to convert the raw image data from each camera into a unified output image from the perspective of the "virtual camera" (e.g., the "top-view" image of FIG. 2).

Intrinsic camera parameters generally do not change over the life of the camera and, as such, once determined during calibration at the time of manufacture or installation, they can be transferred to the image processing unit 109 at power-up or on demand. For digital systems, the data can be transmitted over an LVDS I2C back-channel. For an analog system, the data can be transmitted over an LIN back-channel or through an overlay mechanism.

The approximate camera positions and orientations will be known when they are mounted on the vehicle and calibrated. However, the cameras may become unaligned during the life of the vehicle due, for example, to tolerance stack up and life cycle changes. FIG. 2 illustrates an example of an output of the imaging system 100 when the left side camera is in misalignment. As seen in FIG. 2, the lines painted on the road surface make the misalignment easily noticeable when displayed on the screen. The painted lines from the left side camera image are skewed relative to the painted lines from the front camera at area 205 and relative to the painted lines from the rear camera at area 207. This misalignment, not only affects the quality of the resulting displayed image, but also could present a safety hazard if the image data is relied on for maneuvering of the vehicle.

As such, the image processing unit 109 of the imaging system 100 is configured to provide automatic alignment of the cameras. The automatic alignment can be provided in an "on-demand" manner such that the automatic alignment is performed when initiated by a user or a technician, for example, at end-of production or during vehicle service. Alternatively, the system 100 may be configured to continuously monitor the output of the imaging system and to make adjustments in a "real-time" manner to compensate for deviation caused because of situations like tire pressure changes or vehicle load changes.

Figure 3:
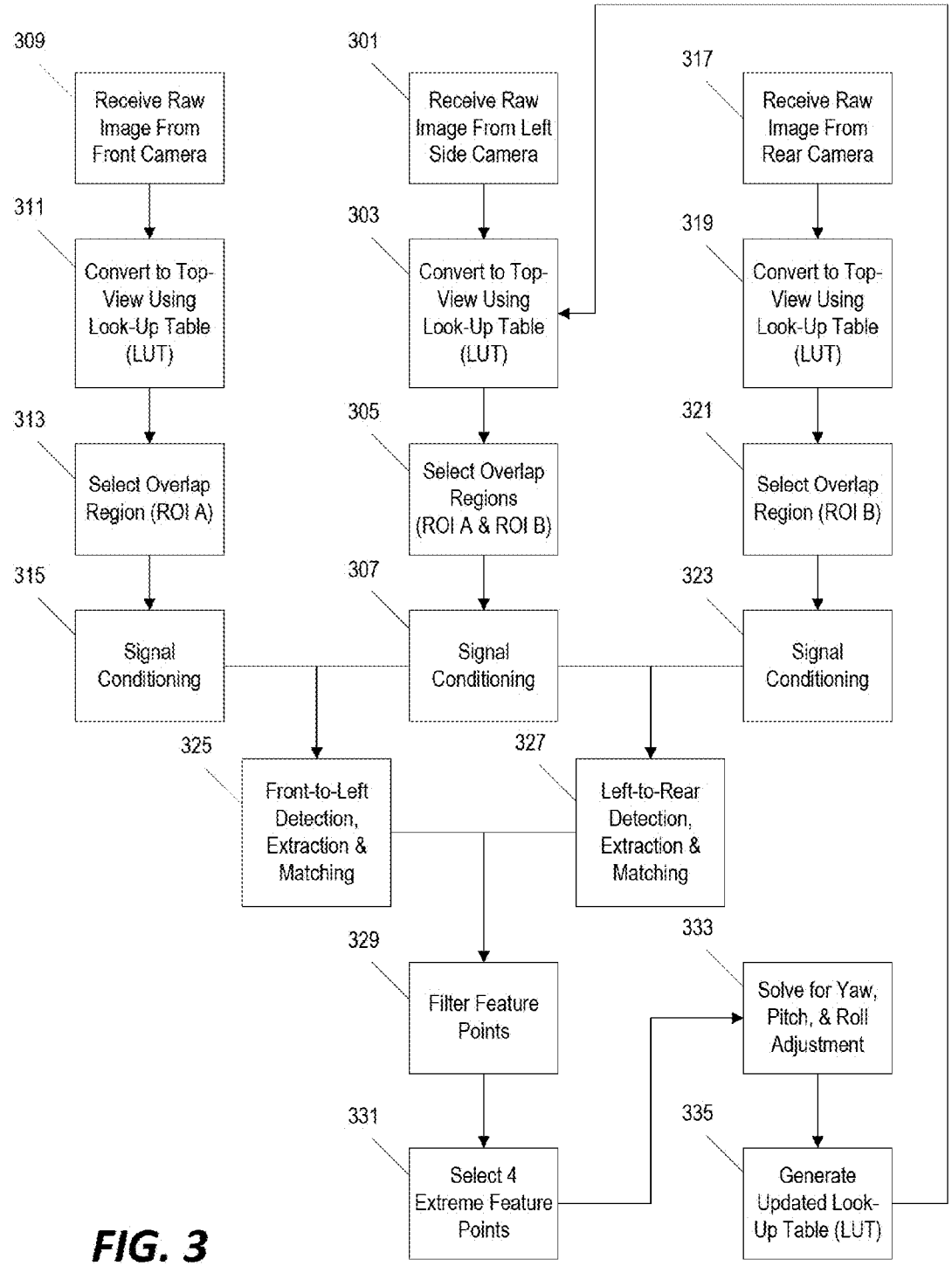
FIG. 3 is a flowchart of a method for mitigating camera misalignment in the multiple-camera imaging system of FIG. 1A.

FIG. 3 illustrates a method for evaluating, detecting, and mitigating camera misalignment of the left side camera 105, such as illustrated in FIG. 2, using the imaging system 100 of FIG. 1A. As noted above, in some implementation, the memory 113 of the image processing unit 109 stores instructions that, when executed by the processor 111, cause the image processing unit 109 to perform the method of FIG. 3.

The memory 113 further stores additional instructions to evaluate, detect, and mitigate misalignment of the other cameras in the system 100 including the front camera 101, the rear camera 103, and the right side camera 107.

The image processing unit (IPU) 109 receives raw image data from the left side camera 105 (step 301) and converts the raw image data into a top-view image using a look-up table (LUT) (step 303). The look-up table defines relationship between pixel locations in the input image and corresponding pixel locations in the output image. As such, the raw image from the left-side camera can be converted to a top-view image by copying pixel data from a pixel location in the raw image to a corresponding pixel location in the output top-view image. The IPU 109 then identifies a region of interest in the rectified top-view image that will overlap with the front camera (ROI A) and a region of interest that will overlap with the rear camera (ROI B) (step 305) and performs signal/image conditioning on the image data (either for the entire top-view image or only for the identified regions of interest) as described in further detail below (step 307).

The IPU 109 similarly receives raw image data from the front camera (step 309), converts the raw image data into a top-view image using another look-up table (LUT) (step 311), identifies a region of interest in the rectified top-view image that corresponds to the overlapping region of interest in the left side camera top-view image data (i.e., ROI A) (step 313), and performs similar signal/image conditioning (step 315). The IPU 109 also receives raw image data from the rear camera (step 317), converts the raw image data into a top-view image using yet another look-up table (step 319), identifies a region of interest in the rectified top-view image that corresponds to the overlapping region of interest in the left side camera top-view image data (i.e., ROI B) (step 321), and again performs similar signal/image conditioning (step 323).

After the raw image data is converted into the top-view rectified image data and signal/image conditioning is performed, the image data from the front camera and the left side camera in the identified region of interest (ROI A) is analyzed to detect, extract, and match feature points in the image data (step 325). Feature points are also detected, extracted and matched in the image data from the left side camera and the rear camera in ROI B (step 327). A detailed example of a method for detecting, extracting, and matching feature points in overlapping regions of interest is described in further detail below.

After feature points are detected and matched in each overlapping region of interest, the feature points are filtered (step 329) and a limited sub-set of feature points are selected in each region of interest (step 331). As described in further detail below, in this example, four matched feature points are identified in each region of interest and used to solve for an appropriate yaw, pitch, and roll adjustment for the left side camera (step 333). After an appropriate yaw, pitch, and roll adjustment is determined, a new, updated look-up table is generated (step 335) and is subsequently used to convert raw image data from the left side camera into top-view image data (step 303) that will be incorporated into the unified top-view image that is shown on the display.

Using the above-noted method to convert raw image data into a top-view rectified video image can give rise to some issues. For example, the image conversion process may require down-sampling which causes visible aliasing artifacts. These artifacts are somewhat reduced in the imaging system 100 because only the overlap regions are being used and the overlap regions exhibit less severe down-sampling.

The free running cameras may also be unmatched in color and brightness and, due to the misalignment, traditional brightness and color matching algorithms might not achieve optimal results. In order to compensate for these issues and to ensure that corresponding feature points are easier to detect in the overlapping image data from both cameras, the incoming image data is condition (as noted above in steps 307, 315, and 323 of FIG. 3).

Figure 4:
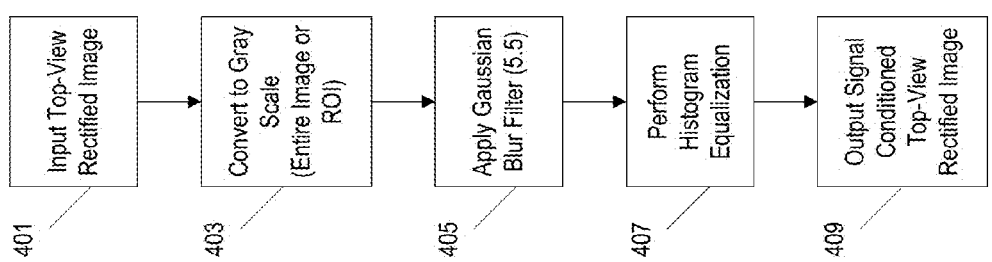
FIG. 4 is a flowchart of a method for performing signal conditioning of the camera images in the multiple-camera imaging system of FIG. 1A.

FIG. 4 illustrates one example of such signal/image conditioning. The method starts with the unconditioned top-view rectified image (step 401). To minimize the computation time, the video data (of either the entire image or of only the overlapping ROI) is converted from ARGB to gray scale (step 403). This conversion to gray scale also serves two other purposes—it "registers" the video data so that it doesn't change and it prepares the image data for histogram equalization. After the conversion to gray scale, a Gaussian blur filter is applied to reduce some of the aliasing artifacts (step 405). In some implementations, this filtering is performed before the down conversion. Finally, histogram equalization is performed to make the overlapping image data from the two cameras (i.e., the left side camera & the front camera or the left side camera & the rear camera) as similar as possible (step 407). The signal conditioned, top-view rectified image data is then passed on for feature point analysis (step 409).

Figure 5A:
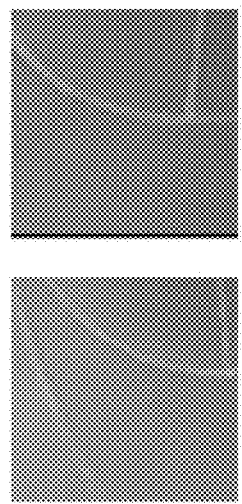
FIG. 5A is an example of unconditioned images captured by two of the cameras of the multiple-camera imaging system of FIG. 1A.
Figure 5B:
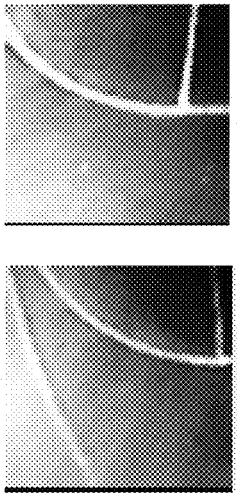
FIG. 5B is an example of the camera images of FIG. 5A after applying the signal conditioning method of FIG. 4.

FIG. 5A illustrates an example of the top-view rectified image data for ROI A from the front camera and from the left side camera. FIG. 5B shows the same image data after the signal conditioning of FIG. 4 is completed.

Figure 6:
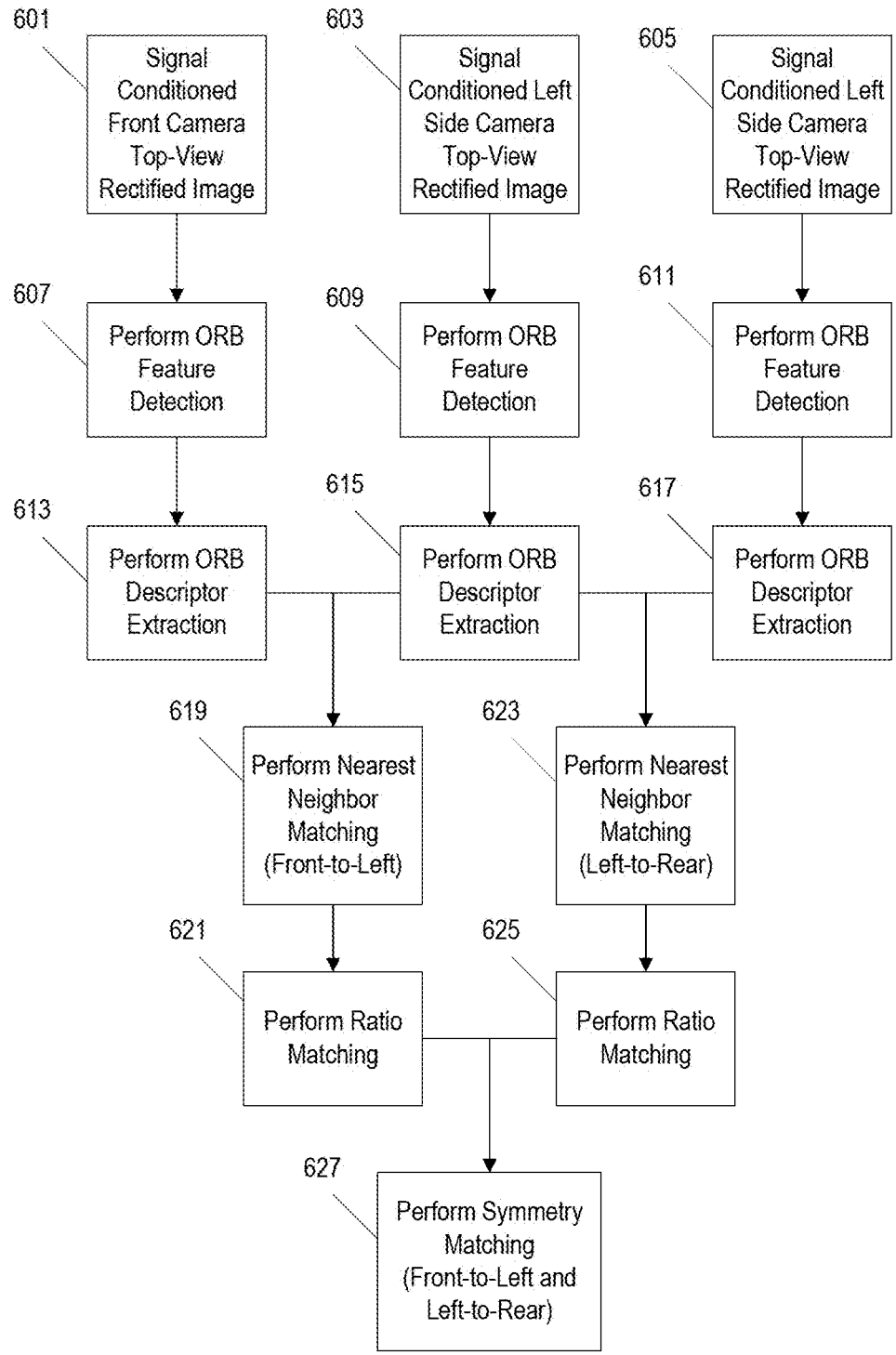
FIG. 6 is a flowchart of a method for detecting and matching feature points in cameras with overlapping fields of view in the multiple-camera imaging system of FIG. 1A.

After the top-view rectified images are conditioned, the IPU 109 applies routines to detect, extract, and match feature points from the two different cameras in each overlapping region of interest. FIG. 6 illustrates one example of a method for detecting and matching features points in the overlapping regions of interest. First, the top-view rectified image data from the front camera, the left side camera, and the rear camera are conditioned as discussed above in reference to FIG. 4 (steps 601, 603, and 605, respectively). The IPU 109 then performs an ORB feature detection for each camera image (steps 607, 609, and 611, respectively). ORB (Oriented FAST and Rotated BRIEF) is a feature point detection algorithm that is robust enough to compensate for minor differences in brightness, zoom, and affine transformations. The ORB feature detector is based on the FAST detection algorithm but also provides feature point orientation information to better support affine differences between the two overlapping images.

After feature points are detected, the IPU 109 applies an ORB descriptor extractor algorithm to regions of interest for each of the three cameras (steps 613, 615, and 617, respectively). The ORB descriptor extractor provides 32 binary descriptors for each of the detected feature points.

After feature points are detected and extracted in each of the three camera images, the matching of feature points in each overlapping region of interest is performed in three steps. First, the two nearest descriptor matches between two images in an overlapping ROI are found. The two nearest matches are the ones with the smallest hamming distance between the two points. Second, the ratio of these distances is checked against a defined threshold to determine if one of the points is a significantly better match than the other point. Points that are not "uniquely" matched to a single corresponding point in the other camera image are discarded. The "nearest neighbor" matching and the ratio matching steps are performed separately for the front-to-left overlapping region of interest (steps 619 and 621, respectively) and for the left-to-rear overlapping region of interest (steps 623 and 625, respectively). In order to reconcile the two matches, a symmetry matching is done to determine which matches exist for both directions (step 627). The symmetry matching ensures that matched points from camera A to camera B agree with a corresponding set of matched points from camera B to camera A. If the same pairing is found in both directions (i.e., left-to-front and front-to-left), then the system concludes that there is a proper match.

Figure 7:
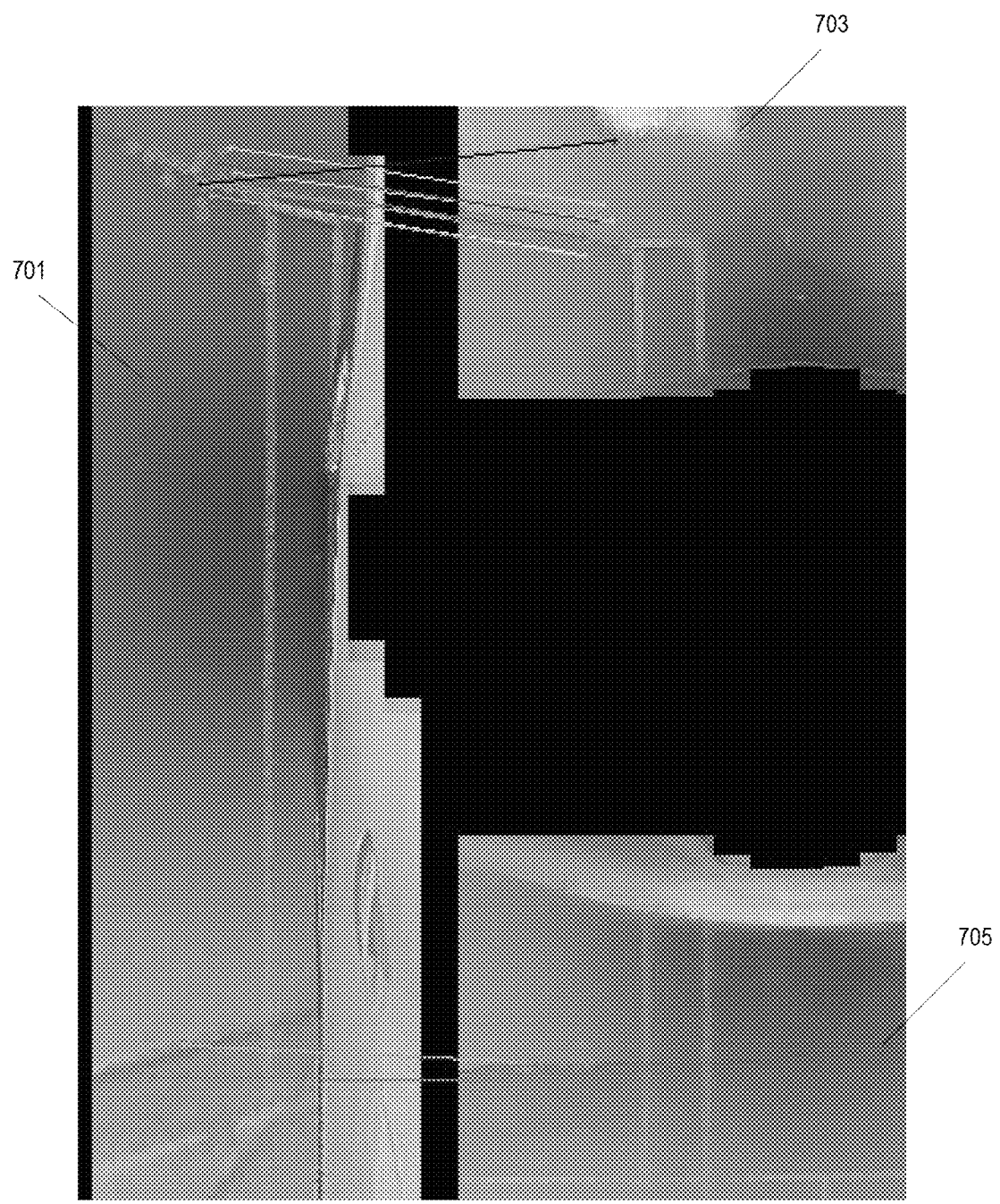
FIG. 7 is a top-view rectified image from three cameras with overlapping fields of view in the system of FIG. 1A highlighting detected and matched feature points according to the method of FIG. 6.

FIG. 7 illustrates an example of the top-view rectified image for the left side camera 701 positioned next to the overlapping portion of the top-view rectified image for the front camera 703 and the overlapping portion of the top-view rectified image for the rear camera 705. Feature points detected by steps 607, 609, and 611 are shown marked in FIG. 7. FIG. 7 also shows lines connecting "matched" points in the overlapping camera images.

The algorithm in the example of FIG. 6 is designed to acquire numerous feature points and to then filter out the "bad" ones with the matching operations. Alternatively, the detection/matching algorithm could be adapted to be more selective in identifying feature points and then apply looser "matching" requirements. However, if the algorithm is tuned to allow for less discriminating matching—resulting in more matches per acquisition, the IPU 109 may be configured to apply a histogram outlier filter to ensure reliable results (see, e.g., step 329 of FIG. 3). The histogram outlier filter is performed by constructing a coarse histogram based on the distances $\Delta X$ and $\Delta Y$ in each matched pairing of points. The outlying points (i.e., those furthest from the maximum histogram bin) are removed from the analysis. Once the filter is performed, four extreme matched points (i.e., the four remaining matched points after the filter that are located the farthest from each other) in each region interest are selected (step 331 of FIG. 3) and are used to determine the yaw, pitch, & roll of the camera.

Figure 8:
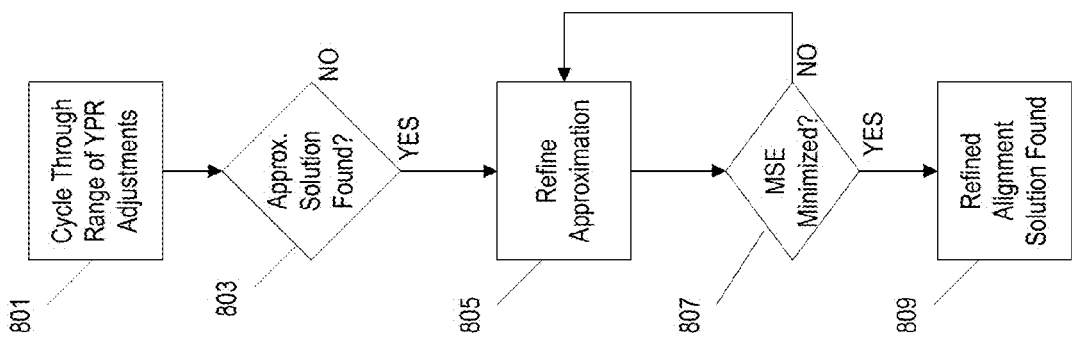
FIG. 8 is a flowchart of a method for determining yaw, pitch, and roll adjustments for the multiple-camera imaging system of FIG. 1A.

After matching feature points are identified and the four extreme matched points in each ROI are identified, the IPU 109 begins to use the identified extreme matched points to solve for a proper yaw, pitch, and roll of the left side camera. FIG. 8 illustrates one example of a method for solving for YPR. The basic premise for solving the yaw, pitch and roll of a camera by minimizing the Euclidean error between the matched feature points of each camera. The first part of solving for YPR is a coarse iteration. This coarse iteration cycles through the full range of yaw, pitch and roll adjustments to find an approximate solution (i.e., where the error is minimal) (step 801). Once this coarse approximation has been made (step 803), a non-linear optimization is performed to refine the initial approximation (step 805) by minimizing the Mean Square Error (MSE) between the aligned and misaligned points (step 807) until a refined alignment solution is identified (step 809).

Figure 9:
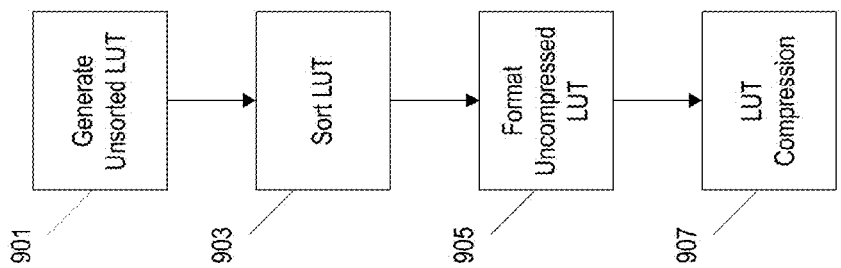
FIG. 9 is a flowchart of a method for generating an updated look-up table to correct camera misalignment in the multiple-camera imaging system of FIG. 1A.

Now that the yaw, pitch, and roll (YPR) of the left side camera have been determined, the IPU 109 generates an updated LUT based on the determined YPR (see, e.g., step 335 in FIG. 3). The updated LUT is configured such that, when it is used to convert the raw image data from the left side camera, the top-view rectified image will be properly aligned with the front camera image data and the rear camera image data. As illustrated in FIG. 9, the IPU 109 first generates an unsorted LUT (step 901). The IPU 109 is programmed to execute an LUT generation algorithm that uses pre-defined characteristics (e.g., intrinsic camera parameters, extrinsic camera parameters, reference points, virtual camera parameters, and screen output parameters) to determine which input stream pixels should be used to create each output pixel in the resulting top-view image. Creating the unsorted LUT is, in some ways, the inverse transform of the rectification. The output of this stage is an "unsorted" LUT that is defined in terms of output pixels and corresponding input pixels.

The second step of the LUT generation (step 903) is to sort the "unsorted" LUT with regard to the input pixel order. The "sorted" LUT is ordered such that it is optimized to allow the image processing hardware to most quickly perform the rectification on the incoming video stream. The sorted LUT is then properly formatted (step 905). The sorted and formatted LUT is then, finally, compressed to minimize the memory bandwidth requirements and to frame the incoming data so that it can be written to memory efficiently (step 907).

Although the examples discussed above refer specifically to adjusting the alignment of the left side camera, as noted above, in some implementations, the IPU 109 is configured to similarly evaluate and mitigate misalignment of other cameras in the imaging system 100. For example, in some implementations, the IPU 109 is configured to detect a misalignment between two adjacent cameras. When the misalignment is detected, the IPU 109 evaluates whether each camera is aligned with the other adjacent camera. For example, if a misalignment is detected between the left side camera and the front camera, the IPU 109 will check for a misalignment between the left side camera and the rear camera and will check for a misalignment between the front camera and the right side camera. If the IPU 109 determines that the left side camera is properly alignment with the rear camera, but the front camera is also misaligned with the right side camera, the IPU 109 will conclude that the front camera is misaligned and will execute the alignment method of FIG. 3 to generate an updated LUT for the front camera.

Furthermore, although the examples described above discuss a four-camera system, in other implementations, the methods and systems described herein may be adapted to systems with more or fewer cameras.

Also, although the examples described above, specifically discuss systems that are configured to generate a top-view output image, in other implementations, the imaging system 100 may be configured to generate an output another type of unified image by combining the image data from multiple cameras with overlapping fields of view. For example, instead of a "top-view" image, the system may be configured to create a panoramic surround view.

Finally, it is noted that, in many of the examples described herein, misalignment of the camera is mitigated by adjusting the yaw, pitch, and roll used to define the position of the "virtual camera." In other words, in some implementations, the physical camera itself might not be moved to correct a misalignment condition. Instead, the LUT is adjusted such that the top-view image data is in proper alignment when the LUT is used to convert the raw image data from the camera. However, in other implementations, the imaging system 100 may also include mechanisms, such as motors, to controllably adjust the physical position and/or orientation of one or more of the cameras in the imaging system 100. In such implementations, the system may be configured to adjust the physical position or orientation of a misaligned camera based on the yaw, pitch, and roll adjustments determined in step 333 of FIG. 3. The LUT might then by further adjusted to "fine tune" the alignment of output image data from the physically adjusted camera.

Thus, the invention provides, among other things, a system and method for creating a unified output image based on image data from multiple cameras with overlapping fields of view by converting a raw image from each camera into a rectified output image using a look-up table and for mitigating camera misalignment by generating an updated look-up table based on feature point detection and matching. Various features and advantages of the invention are set forth in the following claims.

What is claimed is:

1. A method of generating an aligned unified image using image data from at least two cameras positioned on a vehicle, the method comprising:
   receiving raw image data from a first camera positioned on the vehicle;
   converting the raw image data from the first camera into a first rectified output image using a first look-up table, the first look-up table defining at least one pixel location from the raw image data that corresponds to each pixel of the first rectified output image, the first rectified image having a perspective different from that of the raw image data from the first camera;
   receiving raw image data from a second camera positioned on the vehicle, wherein a field of view of the second camera partially overlaps with a field of view of the first camera;
   converting the raw image data from the second camera into a second rectified output image using a second look-up table;
   generating a first unified output image by combining the first rectified output image and the second rectified output image, wherein image data from the first rectified output image in the first unified output image is misaligned relative to the image data from the second rectified output image in the first unified output image;
   detecting a plurality of feature points in the first rectified output image and a plurality of feature points in the second rectified output image;
   matching each feature point of the plurality of feature points in the first rectified output image to a corresponding feature point of the plurality of feature points in the second rectified output image;
   identifying a subset of matched feature points in a region of interest, wherein the subset of matched feature points includes a defined number of feature points in the first rectified output image that are farthest away from the corresponding feature point of the plurality of feature points in the second rectified output image;
   determining a yaw, pitch, and roll of the first camera based on misalignments of only the matched feature points of the subset of matched feature points; and
   updating the first look-up table based on the determined yaw, pitch, and roll of the first camera.

2. The method of claim 1, further comprising:
   receiving further raw image data from the first camera;
   converting the further raw image data from the first camera into a third rectified output image using the updated first look-up table;
   receiving further raw image data from the second camera;
   converting the further raw image data from the second camera into a fourth rectified output image using the second look-up table;
   generating a second unified output image by combining the third rectified output image and the fourth rectified output image, wherein image data from the third rectified output image in the second unified output image is properly aligned relative to the image data from the fourth rectified output image, wherein the proper alignment of the third rectified output image is achieved by the act of updating the first look-up table.

3. The method of claim 2, wherein a physical position of the first camera is not changed between the generation of the first unified output image and the second unified output image.

4. The method of claim 2, wherein receiving further raw image data from the first camera includes receiving video image data from the first camera, wherein receiving further raw image data from the second camera includes receiving video image data from the second camera, and the method further comprising:
generating a unified video output by combining rectified video image data from the first camera with rectified video image data from the second camera.

5. The method of claim 4, further comprising displaying the unified video output on a display screen positioned in an interior of the vehicle.

6. The method of claim 1, further comprising conditioning the first rectified output image and the second rectified output image before detecting the plurality of feature points.

7. The method of claim 6, wherein conditioning the first rectified output image and the second rectified output image includes:
converting the first rectified output image and the second rectified output image to grayscale, and
performing histogram equalization on the first rectified output image and the second rectified output image.

8. The method of claim 1, further comprising:
receiving raw image data from a third camera positioned on the vehicle, wherein a field of view of the third camera partially overlaps with the field of view of the second camera;
converting the raw image data from the third camera into a third rectified output image using a third look-up table;
receiving raw image data from a fourth camera positioned on the vehicle, wherein a field of view of the fourth camera partially overlaps with the field of view of the third camera and partially overlaps with the field of view of the first camera; and
converting the raw image data from the fourth camera into a fourth rectified output image using a fourth look-up table,
wherein generating the first unified output image includes generating the first unified output image by combining the first rectified output image, the second rectified output image, the third rectified output image, and the fourth rectified output image.

9. The method of claim 8, wherein the perspective of the first rectified output image is a top-view perspective of a virtual camera positioned above the vehicle, and wherein the first unified output image includes a top-down view of the vehicle and areas surrounding the vehicle.

10. The method of claim 8, wherein the first camera, the second camera, the third camera, and the fourth camera include a camera mounted on a front end of the vehicle, a camera mounted on a left side of the vehicle, a camera mounted on a right side of the vehicle, and a camera mounted on a rear end of the vehicle.

11. The method of claim 1, wherein detecting the plurality of feature points in the first rectified output image and the plurality of feature points in the second rectified output image further includes detecting a second plurality of feature points in the first rectified output image,
wherein matching of the feature points in the first rectified output image to corresponding feature points in the second output image is unable to match the feature points of the second plurality of feature points to any of the detected feature points of the plurality of feature points in the second rectified output image,
the method further comprising filtering out the unmatched second plurality of feature points in the first rectified output image before determining the yaw, pitch, and roll of the first camera.

12. The method of claim 1, wherein matching each feature point of the plurality of feature points in the first rectified output image to the corresponding feature point of the plurality of feature points in the second rectified output image includes:
performing a first initial matching step by identifying, for each feature point of the plurality of feature points in the first rectified output image, a feature point of the plurality of feature points in the second rectified output image that initially matches the feature point from the first rectified output image;
performing a second initial matching step by identifying, for each feature point of the plurality of feature points in the second rectified output image, a feature point of the plurality of feature points in the first rectified output image that initially matches the feature point from the second rectified output image; and
performing a symmetric matching step by confirming that a matched pair of feature points from the first initial matching step is also matched by the second initial matching step.

13. The method of claim 1, wherein the defined number of matched feature points is four matched feature points, wherein a total number of matched feature points is greater than four, and wherein determining the yaw, pitch, and roll of the first camera includes determining the yaw, pitch, and roll of the first camera based only on the misalignments of the four identified matched feature points.

14. A multiple-camera vehicle imaging system comprising:
a first camera positionable on a vehicle;
a second camera positionable on a vehicle with a field of view that partially overlaps with a field of view of the first camera;
a processor; and
a non-transitory computer-readable memory storing instructions that, when executed by the processor, cause the multiple-camera vehicle imaging system to
receive raw image data from the first camera;
convert the raw image data from the first camera into a first rectified output image using a first look-up table stored on the non-transitory computer-readable memory, the first look-up table defining at least one pixel location from the raw image data that corresponds to each pixel of the first rectified output image, the first rectified image having a perspective different from that of the raw image data from the first camera;
receive raw image data from the second camera;
convert the raw image data from the second camera into a second rectified output image using a second look-up table;
generate a first unified output image by combining the first rectified output image and the second rectified output image, wherein image data from the first rectified output image in the first unified output image is misaligned relative to the image data from the second rectified output image in the first unified output image;
detect a plurality of feature points in the first rectified output image and a plurality of feature points in the second rectified output image;
match each feature point of the plurality of feature points in the first rectified output image to a corresponding feature point of the plurality of feature points in the second rectified output image;
identify a subset of matched feature points in a region of interest, wherein the subset of matched feature points includes a defined number of feature points in the first rectified output image that are farthest away from the corresponding feature point of the plurality of feature points in the second rectified output image;
determine a yaw, pitch, and roll of the first camera based on misalignments of only the matched feature points of the subset of matched feature points; and
updating the first look-up table based on the determined yaw, pitch, and roll of the first camera.

* * * * *